US010673944B2

(12) United States Patent
Chen et al.

(10) Patent No.: US 10,673,944 B2
(45) Date of Patent: *Jun. 2, 2020

(54) SYNCHRONIZATION OF COMPONENTS IN HETEROGENEOUS SYSTEMS

(71) Applicant: International Business Machines Corporation, Armonk, NY (US)

(72) Inventors: Tom C. Chen, Markham (CA); Steven Cooper, Pickering (CA); Roger Pett, Toronto (CA); Trong Truong, Markham (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/237,803

(22) Filed: Jan. 2, 2019

(65) Prior Publication Data

US 2019/0141127 A1 May 9, 2019

Related U.S. Application Data

(63) Continuation of application No. 14/945,592, filed on Nov. 19, 2015, now Pat. No. 10,212,225.

(30) Foreign Application Priority Data

Dec. 23, 2014 (CA) .................................... 2875850

(51) Int. Cl.
*H04L 29/08* (2006.01)
*H04L 29/06* (2006.01)

(52) U.S. Cl.
CPC .......... *H04L 67/1095* (2013.01); *H04L 67/42* (2013.01)

(58) Field of Classification Search
CPC .................................. G06F 8/65; H04L 67/02
See application file for complete search history.

(56) References Cited

U.S. PATENT DOCUMENTS

| 6,718,549 B1 * | 4/2004 | Narin | G06F 9/454 |
| | | | 717/178 |
| 6,751,798 B1 * | 6/2004 | Schofield | G06F 9/547 |
| | | | 719/330 |

(Continued)

OTHER PUBLICATIONS

Office Action (dated Jan. 17, 2018) for U.S. Appl. No. 14/945,592, filed Nov. 19, 2015.

(Continued)

*Primary Examiner* — Shean Tokuta
(74) *Attorney, Agent, or Firm* — Schmeiser, Olsen & Watts, LLP; Mark Vallone (57) ABSTRACT

A method and system for synchronizing components of heterogeneous systems. A request is made to a host computer for a latest version of a client component pertaining to client code identified in a previously received communication. One or more loadable modules, which include an object representing the client component and are bound with a host component, are located at the host computer. The object is retrieved from the one or more loadable modules and sent to the client computer. A host component binary is built with a set of additional components bound to the host component binary. An encoding generated during compilation of the additional components transforms the client component into the object with an array populated with data of the client component. The object is built during link time into the one or loadable modules tightly bound with the host component binary.

18 Claims, 5 Drawing Sheets

(56) References Cited

U.S. PATENT DOCUMENTS

| | | | |
|---|---|---|---|
| 6,981,251 B1* | 12/2005 | Kreller | G06F 9/4862 |
| | | | 709/202 |
| 7,523,444 B2 | 4/2009 | Quinn, Jr. et al. | |
| 7,761,414 B2 | 7/2010 | Freedman | |
| 8,230,414 B1* | 7/2012 | Hand | G06F 8/62 |
| | | | 717/168 |
| 9,130,801 B1* | 9/2015 | Carruth | H04L 29/08072 |
| 9,696,981 B2* | 7/2017 | Martin | G06F 8/313 |
| 2004/0143823 A1* | 7/2004 | Wei | G06F 8/41 |
| | | | 717/140 |
| 2005/0132348 A1* | 6/2005 | Meulemans | G06F 8/65 |
| | | | 717/168 |
| 2006/0167981 A1* | 7/2006 | Bansod | G06F 9/547 |
| | | | 709/203 |
| 2006/0253508 A1* | 11/2006 | Colton | G06F 8/52 |
| 2007/0033248 A1* | 2/2007 | Prevost | H04L 69/18 |
| | | | 709/203 |
| 2007/0038642 A1 | 2/2007 | Durgin et al. | |
| 2007/0233812 A1* | 10/2007 | Piaseczny | H04L 67/2823 |
| | | | 709/219 |
| 2009/0119302 A1* | 5/2009 | Palmer | G06F 16/972 |
| 2009/0157800 A1* | 6/2009 | Cheng | G06F 9/548 |
| | | | 709/203 |
| 2010/0235613 A1* | 9/2010 | Baldwin | G06F 9/4812 |
| | | | 712/244 |
| 2010/0275018 A1* | 10/2010 | Pedersen | G06T 19/00 |
| | | | 713/168 |
| 2011/0078239 A1* | 3/2011 | Heen | G06F 8/65 |
| | | | 709/203 |
| 2011/0202905 A1* | 8/2011 | Mahajan | G06F 8/43 |
| | | | 717/140 |
| 2011/0296398 A1* | 12/2011 | Vidal | G06F 8/65 |
| | | | 717/171 |
| 2012/0054603 A1* | 3/2012 | Demant | G06F 3/0484 |
| | | | 715/247 |
| 2012/0278902 A1* | 11/2012 | Martin | G06F 8/313 |
| | | | 726/28 |
| 2013/0246906 A1* | 9/2013 | Hamon | G06F 17/2252 |
| | | | 715/234 |
| 2013/0311627 A1* | 11/2013 | Fuller | H04L 67/08 |
| | | | 709/222 |
| 2013/0347010 A1* | 12/2013 | Frick | G06F 9/547 |
| | | | 719/330 |
| 2014/0317174 A1* | 10/2014 | Feng | H04L 41/082 |
| | | | 709/203 |
| 2015/0268938 A1* | 9/2015 | Ge | G06F 8/37 |
| | | | 717/108 |
| 2015/0347447 A1* | 12/2015 | Ho | G06F 16/122 |
| | | | 707/622 |
| 2016/0080344 A1* | 3/2016 | Ochs | G06F 16/951 |
| | | | 726/4 |
| 2016/0112203 A1* | 4/2016 | Thom | H04L 9/3247 |
| | | | 713/176 |
| 2016/0182628 A1 | 6/2016 | Chen et al. | |
| 2017/0153883 A1* | 6/2017 | Oliver | G06F 8/65 |

OTHER PUBLICATIONS

Amendment (dated Apr. 16, 2018) for U.S. Appl. No. 141945,592, filed Nov. 19, 2015.

Final Office Action (dated Jul. 11, 2018) for U.S. Appl. No. 14/945,592, filed Nov. 19, 2015.

Final Amendment (dated Sep. 5, 2018) for U.S. Appl. No. 14/945,592, filed Nov. 19, 2015.

Notice of Allowance (dated Oct. 4, 2018) for U.S. Appl. No. 14/945,592, filed Nov. 19, 2015.

* cited by examiner

SYNCHRONIZATION OF COMPONENTS IN HETEROGENEOUS SYSTEMS

This application is a continuation application claiming priority to Ser. No. 14/945,592, filed Nov. 19, 2015, now U.S. Pat. No. 10,212,225, issued Feb. 19, 2019.

TECHNICAL FIELD

The present invention relates generally to version synchronization in a data processing system and more specifically to version synchronization of dependent components running on heterogeneous data processing systems.

BACKGROUND

A typical client and host data processing system scenario requires two or more components running on different platform architectures to synchronize to ensure correct operation of a software capability. Synchronized in this scenario defines a relationship in which the host component and the corresponding client component are designed to function together at a proper level of support. Support is typically specified in the form of a version or level of a respective component. For example, on host system A there is a component that requires a specific version of a client program, associated with the corresponding component on host system A, to be installed on client system B.

A typical approach to maintain synchronization is to package the two corresponding components independently and perform a handshake negotiation to establish compatibility. During performance of the handshake, backward compatibility considerations need to be established and the host component typically needs to handle all levels of function available in older versions of the client component as well as the current version.

The preceding typical approach is typically very costly to maintain because the code needs to be developed and tested with the different versions of the client components. Further, deployment is also typically costly and time-consuming. In one example, a user discovers an incompatibility between a client component in use and a corresponding host component, and contacts a particular desktop support department that performed rollout of the current product image. In turn the desktop support department contacts a programmer supporting a respective server. A software vendor may also be contacted for guidance and service. Once the problem is identified, a new desktop image is built and sent to the user and tested for a resolution of the problem. The process may repeat for every update of the client and server components that require synchronization.

One approach to resolve the described problem discloses a mechanism for synchronization of a "plugin" which implicitly requires a framework available on the plug-in side with corresponding levels of application programming interfaces (APIs) available within the framework upon which the plugin is dependent.

However APIs available on systems and subsystems typically vary greatly and therefore may not represent a common mechanism applicable to all systems and subsystems. Further some programming languages have a dependency on type information being available that can be extracted through "reflection" which may limit deployment to systems and subsystems dependent upon having this type of infrastructure available.

In another example of a resolution, a synchronization system synchronizes applications and data, including applications of differing versions that rely on different underlying data and schemas, and seamlessly map these versions to the underlying synchronized databases. In performing the synchronization the system and associated network typically requires robust resources to maintain, manage and deploy solutions.

SUMMARY

The present invention provides a computer-implemented process, and an associated system, for automatic version synchronization of dependent components running on heterogeneous systems. In response to receiving a communication using a predetermined protocol through a network at a host, it is determined whether required client code is not present on the client. In response to a determination required client code is not present on the client, a required version of the client component is requested at the host. One or more loadable modules are located at the host bound with a host component that represents the client component. The object is sent to the client, wherein the client receives, and loads the object and runs the object as a new component to communicate with the host component at a latest level.

BRIEF DESCRIPTION OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

The present invention may be a system a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing, device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or r device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
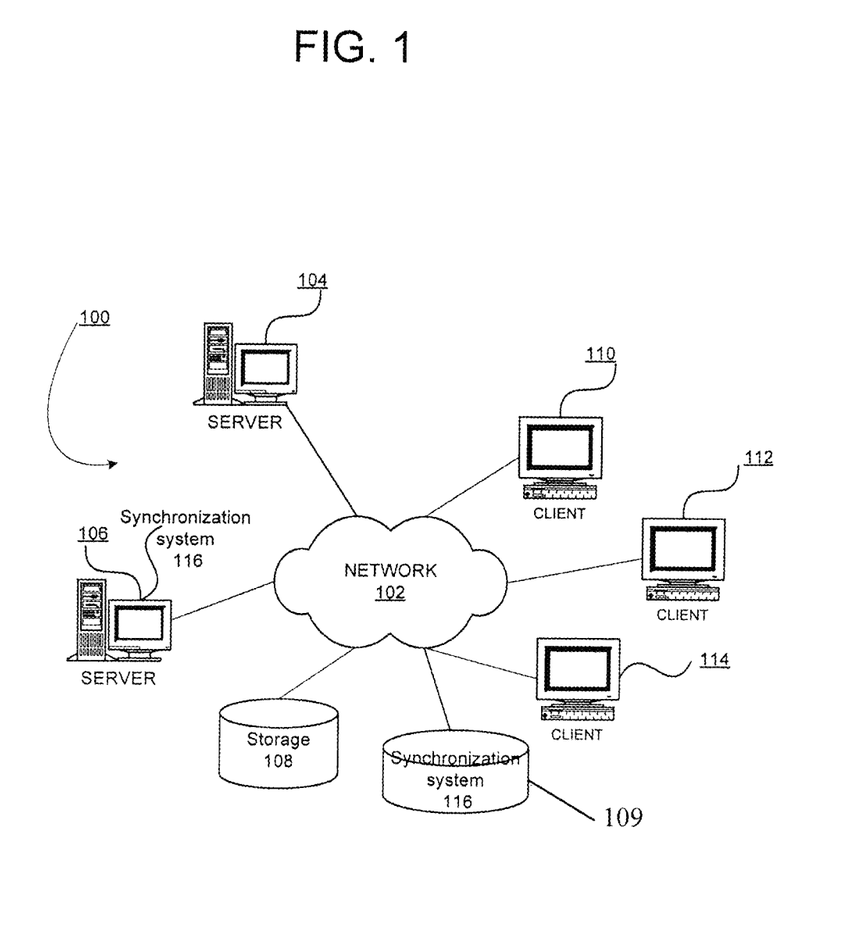
FIG. 1 is a block diagram of an exemplary network data processing system operable for various embodiments of the present invention.
Figure 2:
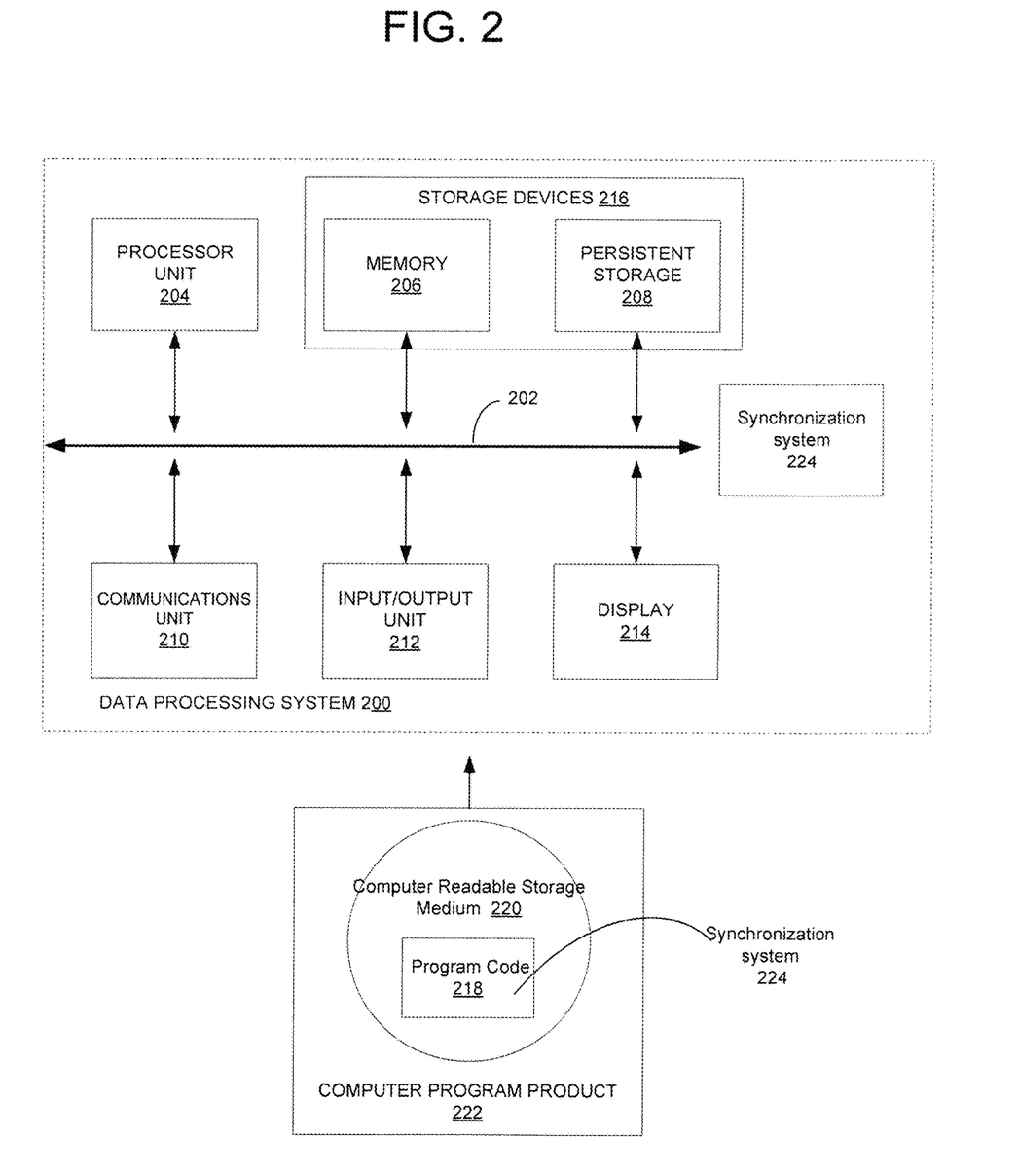
FIG. 2 is a block diagram of an exemplary data processing system operable for various embodiments of the present invention.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which provides communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 or 106 provides data, such as boot files, operating system images, synchronization system 116 and applications to clients 110, 112, and 114. Clients 110, 112, and 114 are clients to server 104 in this example. Network data processing system 100 may include additional servers, clients, and other devices not shown. Synchronization system 116 is also available for download from another storage instance 109.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments of the present invention is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may he removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200 For example, input/output unit 212 may provide a connection for user input through a keyboard, a mouse, and/or some other suitable input device. Further, input/output unit 212 may send output to a printer Display 214 provides a mechanism to display information to a user.

Instructions for the operating system, applications and/or programs including synchronization system 224 in may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable storage media, such as memory 206 or persistent storage 208.

Program code 218 is located in a functional form on computer readable storage media 220 that is selectively removable and may be loaded onto or transferred to data processing system 200 for execution by processor unit 204. Program code 218 and computer readable storage media form computer program product 222 in these examples. In one example, computer readable storage media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable storage media 220 also may take the form of a persistent storage, such as a hard drive, a thumb drive, or a flash memory that is connected to data processing system 200. The tangible form of computer readable storage media 220 is also referred to as computer recordable storage media or a computer readable data storage device. In some instances, computer readable storage media 220 may not be removable.

Alternatively, program code 218 may be transferred to data processing system 200 from computer readable storage media 220 through a communications link to communications unit 210 and/or through a connection to input/output unit 212. The communications link and/or the connection may be physical or wireless in the illustrative examples. Synchronization system 224 in another embodiment is also available for download in the form of program code 218.

In some illustrative embodiments, program code 218 may be downloaded over a network to persistent storage 208 from another device or data processing system for use within data processing system 200. For instance, program code stored in a computer readable data storage device in a server data processing system may be downloaded over a network from the server to data processing system 200. The data processing system providing program code 218 may be a server computer, a client computer, or some other device capable of storing and transmitting program code 218.

Definitionally, a "client component" is client software or program code to be executed in a client computer and a "host component" is host software or program code to be executed in a host computer.

Using data processing system 200 of FIG. 2 as an example, a computer-implemented process for automatic version synchronization of dependent components running on heterogeneous systems is presented. Processor unit 204 in response to receiving a communication using a predetermined protocol through a network at a host determines whether required client code is not present on the client. In response to a determination required client code is not present on the client, a required version of the client component is requested from the host. In one embodiment, the required version of the client component is the latest version of the client component. A loadable module is located by processor unit 204 at the host bound with a host component, wherein an object in the loadable module represents the client component. The object is sent to the client, by processor unit 204 wherein the client receives, and loads the object and runs the object as a new component to communicate with the host component a latest level. The host is a host computer (e.g., server 104 or 106). The client is a client computer (e.g., client 110, 112 or 114).

Embodiments of the disclosure provide a capability for tightly binding the host component and the synchronized client component into a logical unit, dynamically un-packaging the pieces at runtime, sending the corresponding correct client components over a network to the desktop, and automatically installing the correct client components.

Embodiments of the disclosure ensure the host components and the client components are correct and current. Embodiments of the disclosure can further dynamically replace the client component without any user or administrator intervention. As a result, there is significant advantage in speed and efficiency of the rollout of new updates to functionality that requires synchronized client and server components.

Embodiments of the disclosure enable the integration of component synchronization across a set of subsystems and system comprising MVS™, IMS®, CICS®, and DB2® using a unified method including a distributed client component as a load module of the host component. An embodiment further provides a capability to enable a distributed program, containing a client component and a host component, to synchronize during program initialization, before user interactions (MVS®, IMS®, CICS™, and DB2® are trademarks or registered trademarks of International Business Machines Corporation in the United States, other countries, or both).

Embodiments of the disclosure use a tightly coupled approach, which does not use plug-ins and explicitly updates client code. Components of an instance of an embodiment of the disclosure are not bound at run time; rather the host, or server, components and the client components are bound at compile time. The embodiments do not synchronize applications of differing versions; rather the embodiments provide a capability for distributing a matching client component with a particular active server component. Embodiments of the disclosure identify a required level of a client component not present in the client currently and in response to requesting the host component for the required client component, the host component sends the required client component to the client to synchronize the client with the host. The version matching of client and server components does not require an outside deployment product, and works regardless of a supporting virtual machine to which one is connected. Specifically, the client component is kept as a pseudo-loadable code module of the server, which is not actually loaded on the server but uploaded to replace the client providing synchronization between the server of the system and the respective client.

Figure 3:
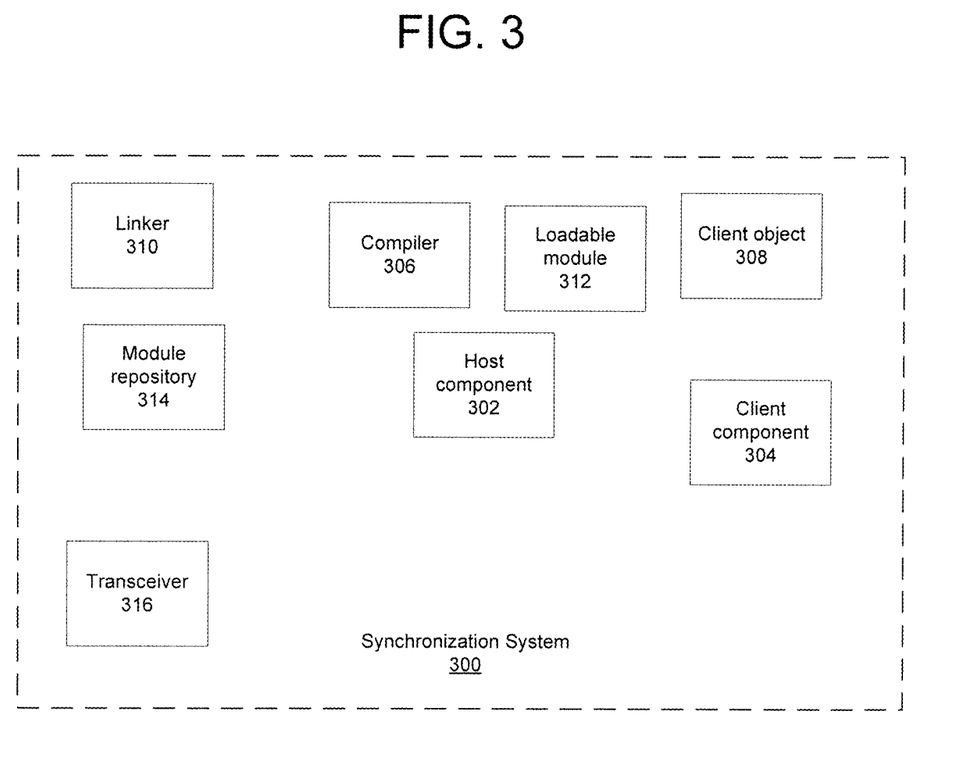
FIG. 3 a block diagram of synchronization system operable for various embodiments of the present invention.

With reference to FIG. 3 a block diagram of synchronization system operable for various embodiments of the disclosure is presented. Synchronization system 300 is an example of an embodiment of the disclosed method for version synchronization of dependent components running on heterogeneous data processing systems.

Synchronization system 300 provides a capability of creating maintaining and deploying a specialized data structure specifically designed to provide self-evident synchronization between a host component and a corresponding interdependent client component. Component as used here may be one or more components as in a set of components without limitation. Synchronization defines a requirement for a host component in one particular instance to have a corresponding client component instance so that each may communicate with the other and perform a predefined set of functions to produce an expected result.

Synchronization system 300 comprises a number of function parts including host component 302, client component 304, compiler 306, client object 308, linker 310, host module 312, module repository 314 and transceiver 316.

Host component 302 provides a capability of a hosted set of functions typically assigned as a set of services offered on a server in a client server relationship. A binary is defined as executable program code in a binary format. Host component 302 is a binary built to function on a particular hardware platform, such as that of a hardware server. However in an embodiment of the disclosure, host component 302 has extra components bound to it that are not typically found in a host environment. In this instance host component 302 has extra components that are not native to the host, but instead represent the binary parts of client component 304.

Client component 304 provides a set of functions as parts needed on a client hardware platform to deliver a set of particular capabilities while matching a corresponding instance of host component 302.

Compiler 306 provides a set of compilation capabilities as an enhanced compiler. Compiler 306 transforms client component 304, comprising a set of parts, into object 308. Object 308 is an intermediate representation of client component 304 in a form of an array. The array of object 308 is populated with the data of the set of parts defined in client component 304.

Linker 310 provides a set of capabilities to link the output of compiler 306, which is object 308, into one or more host loadable module 312 in accordance with the specifications of the particular hardware platform of the host environment on which linker 310 executes. During link time, object 308 is built into a loadable module associated with the binary of host component 302. Depending on the host operating system conventions, loadable module 312 could either be a separate module, or directly linked into the binary of host component 302, Loadable module 312 may also be referred to as a distributed client component. However loadable module 312 is not designed for loading and execution on host environment. Loadable module 312 is particularly designed as a pseudo load module to exploit the built in storage and location services of the host environment. For example, host component 302 is easily able to locate loadable module 312, after successful linking, through normal lookup facilities of the particular hardware platform. Therefore a risk of not being able to locate an associated loadable module is minimized.

Host component 302 and loadable module 312 are referred to as an "earl bind" because the binding or association between the two is set at compile time rather than at run time when a term of "late bind" or "dynamic bind" is used. The early bind specifically addresses a requirement to maintain proper synchronization between host component 302 and client component 304 through use of loadable module 312.

Host component 302 and host loadable module 312, may then be stored in module repository 314 for subsequent retrieval and use. Module repository 314 provides a capability on the particular hardware platform, such as that of a server in the host environment to store, maintain and retrieve on request host component 302 and host loadable module 312.

Transceiver 316 provides a capability in the host environment to send to and receive from one or more client communications in the form of structured and unstructured data. Structured data includes a handshaking protocol used in an exchange between an executing host component 302 and a corresponding executing client component. The handshaking protocol provides a capability to obtain attributes of a client, comprising a particular version of the client as well as an operating environment including a hardware platform and operating system in use by the client.

In examples of the disclosure, a set of subsystems and system are used comprising MVS™, DviS®, CICS®, and DB2®, as an example of the host environment using a unified method including a distributed client component as a loadable module of the host component. However the examples provided are for illustrative purpose only and do not imply an unnecessary limitation solely to the instances described in the examples.

System z® is an enterprise class system typically viewed as a market leader for systems of records. (System z® is a registered trademark of International Business Machines Corporation in the United States, other countries, or both) Effective problem determination is an important aspect of ensuring high quality on these systems. Embodiments of the disclosure typically provide a capability to accelerate innovation in delivery of new debugging capability, to significantly lower overhead of testing the innovation, and to remove a burden of maintaining n-2 compatibility between a client and a corresponding host.

Embodiments of the disclosure are applicable for all major System z sub-systems including MVS, CICS, MS and DB2. During a debug session, a debugger becomes an integral part of a subsystem and accordingly is subject to a uniqueness of services of that subsystem including application programming interfaces available to locate a client binary. For example, within MVS, C programming language runtime routines are available, but different APIs exist for other subsystems. Using the proposed binding of the disclosure of the client binary as a loadable module of the host component, an embodiment is able to use a common technique to find a client binary across all the subsystems. In addition, by having the client binary tightly bound to the host component, problems in locating the client binary when installed in a separate location (dataset or hierarchical file system (RFS) path) and requiring a system programmer to properly install the client binary including setting appropriate security access are avoided.

In addition, using embodiments of the disclosure provides a capability of sending full debug information to the client. Sending full debug information to the client delivers a set of new capabilities and debugging innovation without concern for dependent client frameworks or wrappers that need synchronization. Accordingly new features can be delivered in entirety without a burden of lowest common denominator considerations for backward compatibility. The host component is specifically built with the corresponding client component required, therefore by design there can be no mismatch between the host component and the client component.

Further, embodiments of the disclosure typically lower testing cost because as in the current example, there is an engine corresponding to an installed host component across all System z subsystems. In absence of an embodiment, all possible permutations of client versions and host versions in the field and across all subsystems would have to be tested representing a relatively large investment in time and resources.

Figure 4:
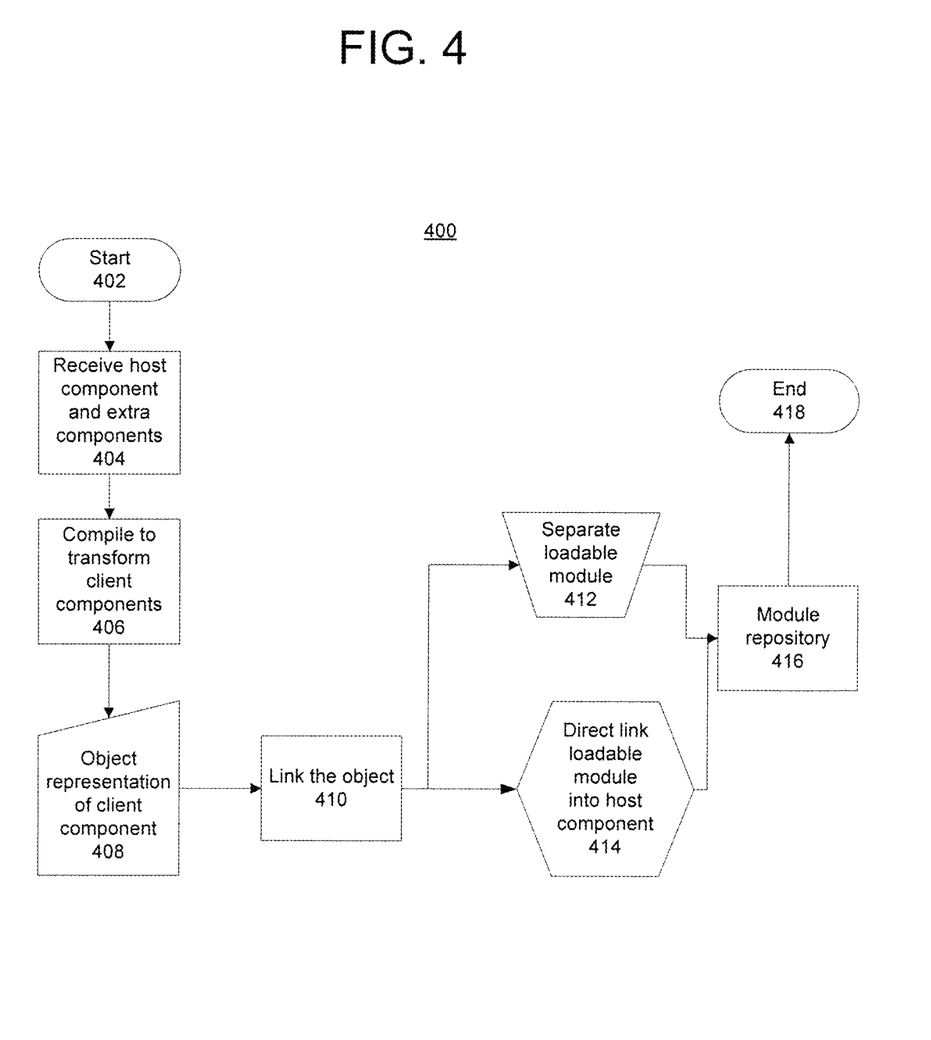
FIG. 4 is a flowchart of a build process of the synchronization system of FIG. 3 operable for various embodiments of the present invention.

FIG. 4 is a flowchart of a build process which is a method operable for various embodiments of the present invention. Process 400 is an example of a build process used to create a loadable module used for version synchronization of dependent components running on heterogeneous data processing systems.

Process 400 begins (step 402) and receives a host component binary (step 404). This instance of a host component is particular that this host component is a binary built with a binding of a set of extra components. The extra components however are not native to the host environment of the host component binary. Rather the extra components represent binary parts of a client component, which is defined to correspond to the particular instance of the host component binary. Therefore the particular pairing of the host component binary and binary parts of the client component are explicitly synchronized.

Process 400 compiles the set of extra components (step 406). During the compilation, an encoding is performed that transforms the client component parts into an object (step 408) with an array that is populated with the data of the set of extra components.

Process 400 links (i.e., inserts) the object from step 408 produced as output of the compilation into a loadable module associated with the host component binary (step 410). Depending on the host operating system, the loadable module from step 410 is transformed into one or more of separate modules (step 412), or directly linked into the host component binary (step 414).

Process 400 stores the host component binary and the one or more loadable modules (if one or more separate modules) in a module repository on the host environment of a host computer (step 416) and terminates thereafter (step 418).

Process 400 describes a method for tightly binding, both the host component binary and the synchronized client component into one logical unit. The logical unit is dynamically unpackaged at runtime into respective parts to enable sending correct client components over a network to a desktop, and automatically installing the correct client components.

This method always ensures that the host and client components are up-to-date and can dynamically replace the client component without any user or administrator intervention. As a result, there are significant advantages in the speed and efficiency of rollout new updates to functionality that requires a synchronized client and server components.

Figure 5:
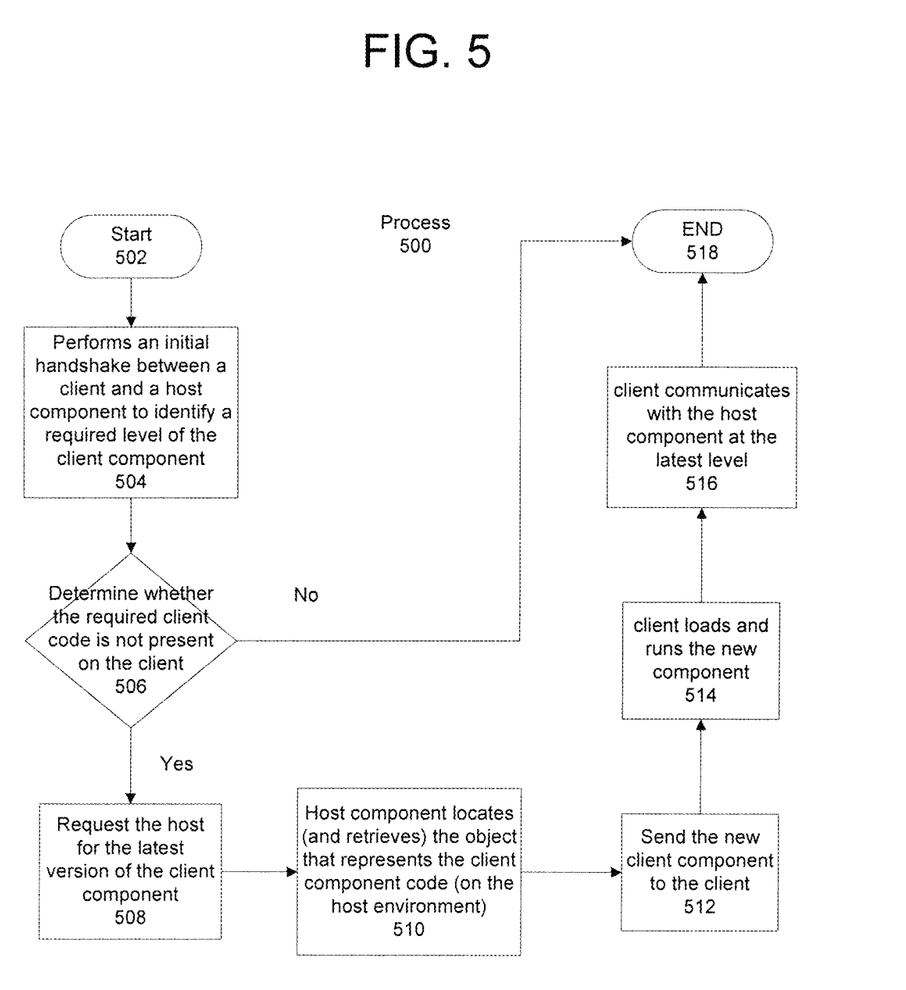
FIG. 5 is a flowchart of a runtime process of the synchronization system of FIG. 3 in accordance with one embodiment of the present invention.

FIG. 5 is a flowchart of a runtime process which is a method operable for various embodiments of the present invention. Process 500 is an example of a communication exchange used in the method for version synchronization of dependent components running on heterogeneous data processing systems. The process 500 performs a method for synchronizing components of heterogeneous systems.

Process 500 begins (step (502) and performs (step 504) receiving a communication using a predetermined protocol through the network 102. In one embodiment the communication using the predetermined protocol is an initial handshake between a client component and a host component. The initial handshake identifies a required level of the client component.

Process 500 determines whether the client code identified in the communication is not present on the client computer (step 506) in response to receiving the communication in step 504. In response to a determination that the client code is not present on the client computer, a request is made to the host asking for the required version of the client component pertaining to the client code (step 508). When process 500 determines the client code is present on the client, process 500 terminates (step 518).

Process 500 locates one or more loadable modules at the host computer bound with a host component that represents the client component and, using the host component, locates (and retrieves), from the one or more loadable modules that include the object representing the client component code (on the host environment) (step 510). The host component is able to locate the client component code because the host component has location information for the client component code created during the link process. The client component is part of the host component binary itself, which makes locating and retrieval of the required objects of the client component code from the one or more loadable modules relatively straightforward.

In response to locating (and retrieving) the required objects of the client component code, process 500 sends the object as a new client component to the client computer, wherein the client computer receives, loads and runs the object (as a new client component) to communicate with the host component at a latest level of the client component (step 512). The client component is in a compressed form, which reduces the time to send as well as network resources used in the transmitting and receiving of the new client components.

In response to receiving the new client component, the client decompresses and loads then runs the new component (step 514). The decompression, loading and execution on the client is part of a self-install of the new client component, which reduces the effort on the client to implement the new client component.

A logical extension of process 500 occurs when there are several incompatible clients to be served. For example, when a first client operates in a first client environment and a second client operates in a second client environment in which the client environment differs from the first client environment. In this case, the initial handshake includes both a version of the client and a type of the client. The host component now includes required objects for each respective supported client.

Once the new component is installed on the client, the client communicates with the host component at the latest level (step 516) and terminates thereafter (step 518). The operation of process 500 relies on the new client component created using process 400 of FIG. 4 to provide the host component and loadable module using a tightly coupled approach, which does not use plug-ins and explicitly updates client code. Process 500 accordingly provides a capability for distributing a matching client component with a particular active server component. Process 500, which ensures a response to requesting the host component for the required client component, is fulfilled by the host component sending the required client component to the client to synchronize the client with the host. The version matching of client and server components is self-contained because of the fixed association between the host component and the loadable module of the client component and therefore does not require an outside deployment product. Process 500 works regardless of a supporting virtual machine to which a client is connected because the host component s built with knowledge of the specific client component and a respective location. Specifically, the client component is kept as a pseudo-loadable code module of the server, (host component) but is not loaded on the server. Rather the pseudo-loadable code module is uploaded to the client as a new installation, which does not replace a previous version of the client component, thereby providing a correct combination of the server and respective client ensuring proper synchronization programmatically. The existing client version is retained because the existing client version may be required to communicate with another down-level host component. Using this technique enables a single client to participate in respective sessions with the required set of current host versions that are deployed.

Thus, the present invention provides an illustrative embodiment of a computer-implemented process for automatic version synchronization of dependent components running on heterogeneous systems, in response to receiving a communication using a predetermined protocol through a network at a host. The process determines whether required client code is not present on the client. In response to a determination that required client code is not present on the client, a required version of the client component is requested at the host. A loadable module is located at the host bound with a host component that represents the client component. The object is sent to the client, wherein the client receives, and loads the object and runs the object as a new component to communicate with the host component at a latest level.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable data storage device having computer executable instructions stored thereon in a variety of forms. Examples of computer readable data storage devices include recordable-type media, such as a floppy disk, a hard disk drive, a RAM, CD-ROMs, DVD-ROMs. The computer executable instructions may take the form of coded formats that are decoded for actual use in a particular data processing system.

A data processing system suitable for storing and/or executing computer executable instructions comprising program code will include one or more processors coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

A computer program product of the present invention comprises one or more computer readable hardware storage devices having computer readable program code stored therein, said program code containing instructions executable by one or more processors to implement the methods and processes of the present invention.

A computer system of the present invention comprises one or more processors, one or more memories, and one or more computer readable hardware storage devices, said one or more hardware storage device containing program code executable by the one or more processors via the one or more memories to implement the methods and processes of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method for synchronizing components of heterogeneous systems, said method comprising:
    making, by one or more processors of a computer system, a request to a host computer for a latest version of a client component pertaining to client code identified in a previously received communication;
    locating, by the one or more processors, one or more loadable modules at the host computer bound with a host component, wherein the one or more loadable modules include an object representing the client component;
    retrieving, by the one or more processors, from the one or more loadable modules, the object representing the client component;
    sending, by the one or more processors, the object to the client computer, wherein the client computer is configured to receive, load and run the object as a new client component to communicate with the host component at a latest level of the client component;
    building, by the one or more processors, a host component binary with a set of additional components bound to host component binary, wherein the additional components are not native to the host computer, and represent binary parts of a corresponding client component;
    generating, by the one or more processors, an encoding during compilation of the additional components, wherein the encoding transforms the client component into the object with an array populated with data of the client component; and
    building, by the one or more processors during link time, the object into the one or loadable modules tightly bound with the host component binary, wherein the one or more loadable modules is one of one or more separate modules, or directly linked into the host component binary in accordance with a host operating system.

2. The method of claim 1, wherein the communication is an initial handshake between the client component and the host component, said initial handshake identifying a required level of the client component.

3. The method of claim 1, wherein the communication is an initial handshake between the client component and the host component, said initial handshake identifying a required level of the client component, and at least one of a hardware platform and an operating system variant.

4. The method of claim 1, wherein said retrieving the object comprises:
    the host component locating the object that represents the client component, wherein a single variant of the client component exists using a required level of the client component wherein the host component comprises a set of objects for other client computers, and wherein each object of the set of objects is specific to a respective other client computer.

5. The method of claim 1, wherein there are several incompatible clients, wherein the initial handshake includes a version and a client type, and wherein the host component includes objects for all clients.

6. The method of claim 1, wherein the one or more loadable modules are pseudo load modules of a same predetermined type having a same set of predetermined characteristics as a normal load module, but the one or more loadable modules tightly bound with the host component binary are non-executable on the host operating system.

7. A computer program product, comprising one or more computer readable hardware storage devices having computer readable program code stored therein, said program code containing instructions executable by one or more processors of a computer system to implement a method for synchronizing components of heterogeneous systems, said method comprising:
- making, by the one or more processors, a request to a host computer for a latest version of a client component pertaining to client code identified in a previously received communication;
- locating, by the one or more processors, one or more loadable modules at the host computer bound with a host component, wherein the one or more loadable modules include an object representing the client component;
- retrieving, by the one or more processors, from the one or more loadable modules, the object representing the client component;
- sending, by the one or more processors, the object to the client computer, wherein the client computer is configured to receive, load and run the object as a new client component to communicate with the host component at a latest level of the client component;
- building, by the one or more processors, a host component binary with a set of additional components bound to host component binary, wherein the additional components are not native to the host computer, and represent binary parts of a corresponding client component;
- generating, by the one or more processors, an encoding during compilation of the additional components, wherein the encoding transforms the client component into the object with an array populated with data of the client component; and
- building, by the one or more processors during link time, the object into the one or loadable modules tightly bound with the host component binary, wherein the one or more loadable modules is one of one or more separate modules, or directly linked into the host component binary in accordance with a host operating system.

8. The computer program product of claim 7, wherein the communication is an initial handshake between the client component and the host component, said initial handshake identifying a required level of the client component.

9. The computer program product of claim 7, wherein the communication is an initial handshake between the client component and the host component, said initial handshake identifying a required level of the client component, and at least one of a hardware platform and an operating system variant.

10. The computer program product of claim 7, wherein said retrieving the object comprises:
- the host component locating the object that represents the client component, wherein a single variant of the client component exists using a required level of the client component wherein the host component comprises a set of objects for other client computers, and wherein each object of the set of objects is specific to a respective other client computer.

11. The computer program product of claim 7, wherein there are several incompatible clients, wherein the initial handshake includes a version and a client type, and wherein the host component includes objects for all clients.

12. The computer program product of claim 7, wherein the one or more loadable modules are pseudo load modules of a same predetermined type having a same set of predetermined characteristics as a normal load module, but the one or more loadable modules tightly bound with the host component binary are non-executable on the host operating system.

13. A computer system, comprising one or more processors, one or more memories, and one or more computer readable hardware storage devices, said one or more hardware storage device containing program code executable by the one or more processors via the one or more memories to implement a method for synchronizing components of heterogeneous systems, said method comprising:
- making, by the one or more processors, a request to a host computer for a latest version of a client component pertaining to client code identified in a previously received communication;
- locating, by the one or more processors, one or more loadable modules at the host computer bound with a host component, wherein the one or more loadable modules include an object representing the client component;
- retrieving, by the one or more processors, from the one or more loadable modules, the object representing the client component;
- sending, by the one or more processors, the object to the client computer, wherein the client computer is configured to receive, load and run the object as a new client component to communicate with the host component at a latest level of the client component;
- building, by the one or more processors, a host component binary with a set of additional components bound to host component binary, wherein the additional components are not native to the host computer, and represent binary parts of a corresponding client component;
- generating, by the one or more processors, an encoding during compilation of the additional components, wherein the encoding transforms the client component into the object with an array populated with data of the client component; and
- building, by the one or more processors during link time, the object into the one or loadable modules tightly bound with the host component binary, wherein the one or more loadable modules is one of one or more separate modules, or directly linked into the host component binary in accordance with a host operating system.

14. The computer system of claim 13, wherein the communication is an initial handshake between the client component and the host component, said initial handshake identifying a required level of the client component.

15. The computer system of claim 13, wherein the communication is an initial handshake between the client component and the host component, said initial handshake identifying a required level of the client component, and at least one of a hardware platform and an operating system variant.

16. The computer system of claim 13, wherein said retrieving the object comprises:
- the host component locating the object that represents the client component, wherein a single variant of the client component exists using a required level of the client component wherein the host component comprises a set of objects for other client computers, and wherein each object of the set of objects is specific to a respective other client computer.

17. The computer system of claim 13, wherein there are several incompatible clients, wherein the initial handshake includes a version and a client type, and wherein the host component includes objects for all clients.

18. The computer system of claim 13, wherein the one or more loadable modules are pseudo load modules of a same predetermined type having a same set of predetermined characteristics as a normal load module, but the one or more loadable modules tightly bound with the host component binary are non-executable on the host operating system.

* * * * *